United States Patent [19]

Kondo

[11] 4,373,616
[45] Feb. 15, 1983

[54] DISC BRAKES

[75] Inventor: Toshio Kondo, Toyota, Japan

[73] Assignee: Aisin Seiki Kabushiki Kaisha, Kariya, Japan

[21] Appl. No.: 228,186

[22] Filed: Jan. 26, 1981

Related U.S. Application Data

[63] Continuation of Ser. No. 78,154, Sep. 24, 1979, abandoned.

[30] Foreign Application Priority Data

Sep. 28, 1978 [JP] Japan ............................... 53-119609

[51] Int. Cl.³ ........................................... F16D 55/224
[52] U.S. Cl. ................................ 188/73.45; 188/73.32
[58] Field of Search ................. 188/72.4, 73.32, 73.39, 188/73.43, 73.45

[56] References Cited

U.S. PATENT DOCUMENTS

| 3,155,194 | 11/1964 | Gancel | 188/73.43 |
| 4,022,297 | 5/1977 | Haraikawa | 188/73.45 |
| 4,072,216 | 2/1978 | Haraikawa | 188/73.32 |
| 4,232,764 | 11/1980 | Yamamoto | 188/73.32 |

FOREIGN PATENT DOCUMENTS

| 2807620 | 8/1978 | Fed. Rep. of Germany | 188/73.32 |
| 52-9771 | 1/1977 | Japan | 188/73.45 |
| 52-72065 | 6/1977 | Japan | 188/73.32 |

Primary Examiner—Duane A. Reger
Attorney, Agent, or Firm—Oblon, Fisher, Spivak, McClelland & Maier

[57] ABSTRACT

A disc brake includes a caliper slidably supported by an adapter through a caliper supporting pin, each one end portion of a pair of friction pads being in contact with an arm portion of the adapter and each of the other end portions of the friction pads being in contact with the inside wall portion of the caliper whereby braking torque exerted under vehicle forwarding movement is directly received by the adapter and is received by the adapter through the caliper and the caliper supporting pin under vehicle reverse movement.

2 Claims, 7 Drawing Figures

DISC BRAKES

This is a continuation of application Ser. No. 078,154, filed Sept. 24, 1979, now abandoned.

BACKGROUND OF THE INVENTION

1. Field of the Invention:

This invention relates to vehicle disc brakes and more particularly to disc brakes for bicycles.

2. Description of the Prior Art:

In conventional floating caliper type disc brakes, braking torque exerted upon friction pads has been directly transmitted to an adapter which is secured to a vehicle non-rotational part.

The adapter also has a function of guiding slidable movement of a caliper, and therefore, in order to maintain enough strength and rigidity both the adapter and caliper must be large in size and complex in shape.

However, according to the invention, braking torque exerted upon friction pads is directly received by the adapter when the brake is applied under vehicle forwarding movement and is received by the adapter through the caliper and caliper supporting member when the brake is applied under vehicle reverse movement. This may thus serve to minimize the structure necessary and lighten the weight of the caliper and adapter.

SUMMARY OF THE INVENTION

One object of the present invention is to provide for a disc brake assembly which allows for the braking torque exerted upon the friction pads to be directly received by an adapter when the brake is applied under vehicle forward movement and which, on the other hand, is received by the adapter through the caliper and caliper supporting member when the brake is applied under vehicle reverse movement.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts through the several views, and wherein.

DETAILED DESCRIPTION OF THE PREFERRED EMBODIMENTS

Figure 2:
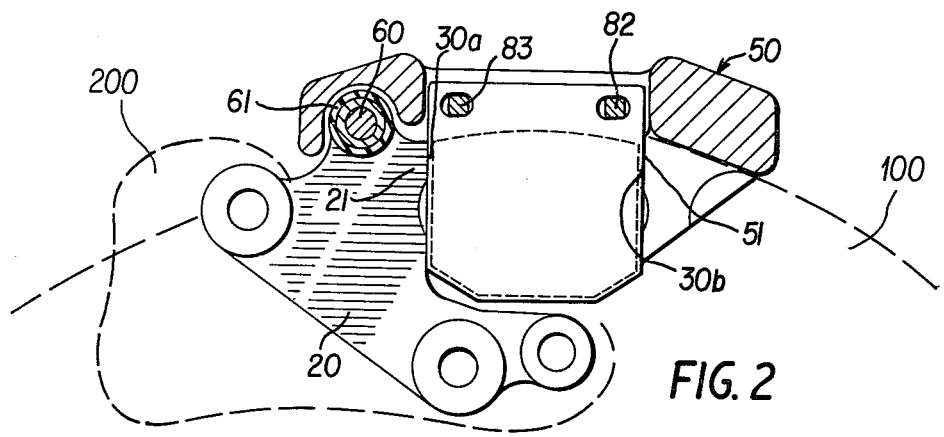
FIG. 2 is a view of the embodiment of FIG. 1 taken along line II—II.
Figure 3:
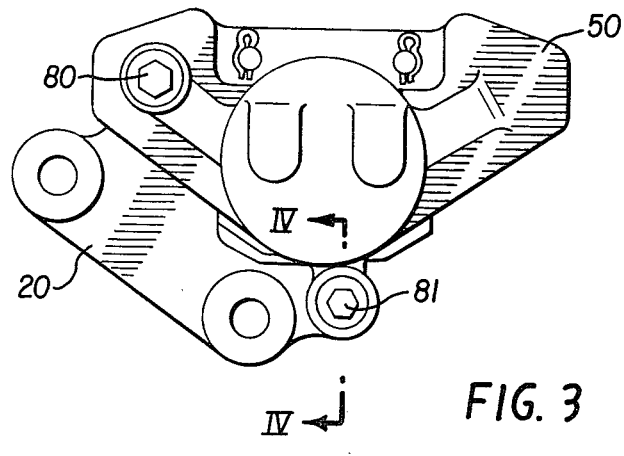
FIG. 3 is an elevational view of the assembled parts of the embodiment of FIG. 1.

Reference numeral 10 designates a disc which is secured to a wheel 100 of a vehicle for unitary rotation therewith. An adapter member 20 (shown in FIGS. 2-4) is secured to a non-rotatable part 200 of the vehicle and includes an arm portion 21. A pair of friction pads 30, 40 includes back plate 31, 41 and friction material 32, 42, respectively, oppositely positioned with respect to disc 10.

Friction pads 30, 40 are supported by the arm portion 21 of the adapter 20 and are movable along the direction of rotational axis of the disc 10. A caliper 50 has an opening 50a at its upper side and is supported by the arm 21 of the adapter. The caliper 50 is movable along the rotational axis direction of the disc 10 and has a cylinder portion 52 in which is disposed a piston 53. The piston 53 is slidable within the cylinder portion 52 by the pressurized fluid supplied from a master brake cylinder (not shown) through inlet port 54.

When the pressurized fluid is supplied to the cylinder portion 52, the piston 53 moves upward to force the friction pad 30 toward one side of the disc 10 so as to be in frictional engagement therewith. At the same time, the caliper 50 moves downward (as seen in FIG. 1) due to the reaction to force the other friction pad 40 toward the other side of the disc 10 so as to be in frictional engagement to thereby apply brake force to the wheel secured to the disc.

Figure 4:
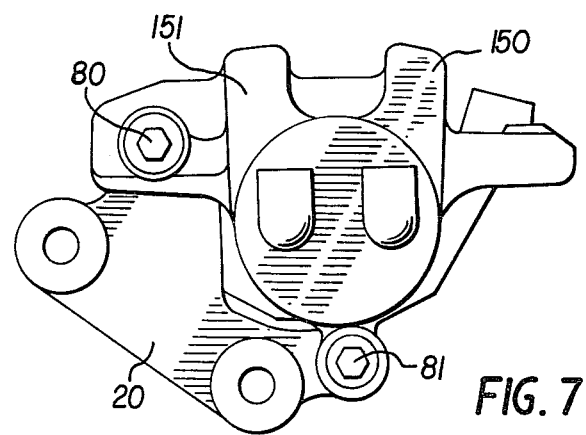
FIG. 4 is a view taken along the line IV—IV of FIG. 3.

A main body 51 of the caliper 50 is movably supported by the adapter 20 through pin 60 (FIG. 1) and pin 70 (FIG. 4). The pin 60 is slidably but fittingly inserted into a blind bore 22 provided at the arm portion 21 of the adapter 20. The head of the pin 60 is secured to the caliper 50 by a bolt 80. The pin 70 (FIG. 4) is inserted into a projection portion 55 of the caliper 51 and is secured to the adapter 20 by bolt 81.

Reference numeral 61 (FIG. 1) and 71 (FIG. 4) designate elastic boots which protect the sliding surfaces of pins 60 and 70 from rust or invasion of exterior materials. Reference numerals 82, 83 designate supporting rods for guiding frictional pads 30 and 40.

Figure 1:
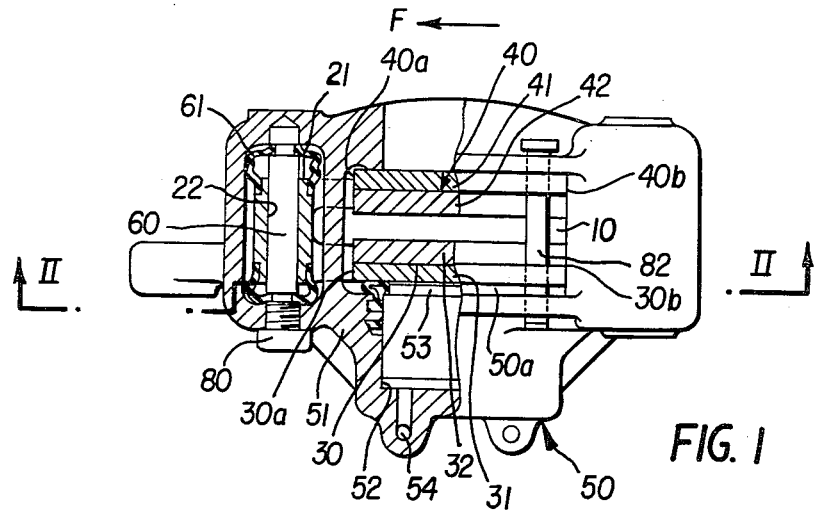
FIG. 1 discloses a top, partially cut away view of the first embodiment of the present invention.

Each one end 30a, 40a of the pads 30, 40 is in contact with the arm portion 21 of the adapter 20 and when the brake is applied under a vehicle forward running condition in the direction of arrow F in FIG. 1, the brake torque exerted upon friction pads 30, 40 will be received directly by the arm portion 21 through the portions 30a, 40a of the pads 30 and 40. Similarly, each of the other ends 30b, 40b of the pads 30, 40 is in contact with main body part 51 of the caliper 50 and when the brake is applied under a vehicle rearward running condition, brake torque exerted upon pads 30, 40 is received by the adapter 20 through main body part 51 of caliper 50 and the pin 60. In the latter case, brake torque is not so great that bending stress influenced upon pin 60 can be negligible.

Figure 5:
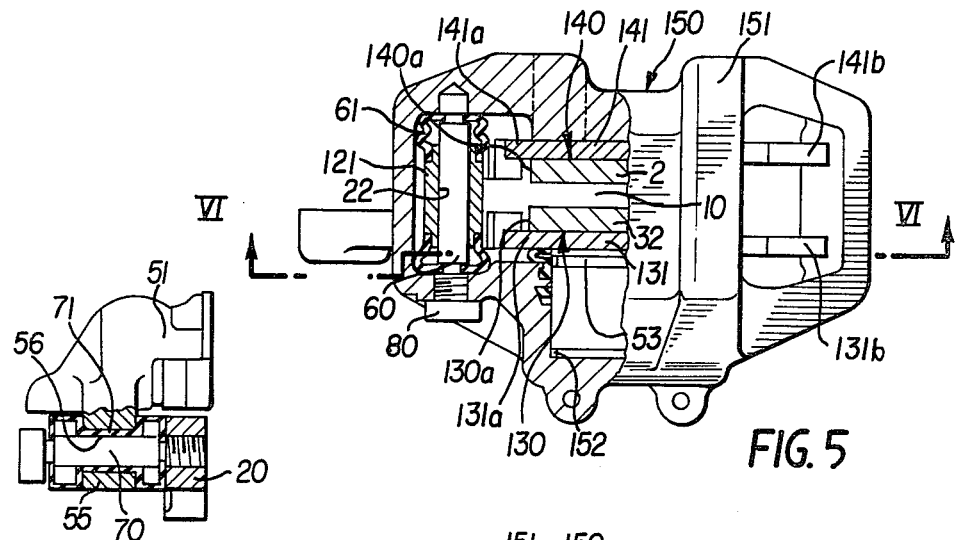
FIG. 5 is a partially cut away view of the second embodiment of the present invention.
Figure 6:
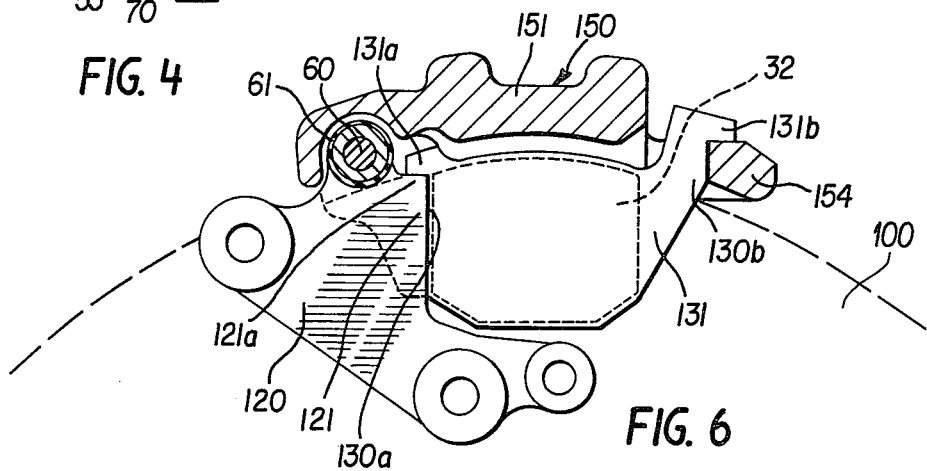
FIG. 6 is a view taken along the line V—V of FIG. 5.
Figure 7:
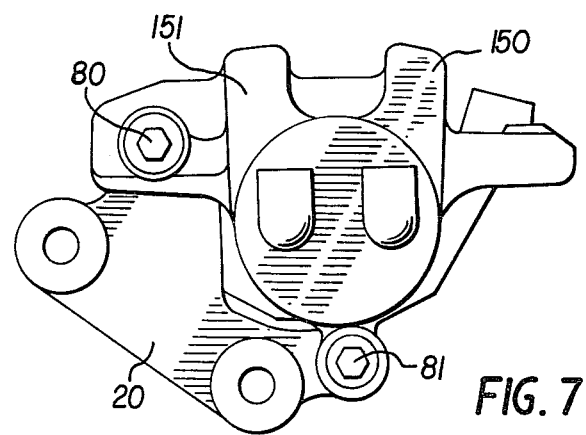
FIG. 7 is an elevational view of the second embodiment.

In the second embodiment of the present invention as shown in FIGS. 5-7, most parts illustrated are the same as the first embodiment and, accordingly, are given the same numbers or are listed in a 100 series. In this embodiment, caliper 150 has a C-shape in section or is of a curved or arcuate shape, frictional pads 130, 140 have backing plates 131, 141 and each one end 131a, 141a thereof is supported by a shoulder 121a of the arm portion 121 of the adapter 120, and each of the other ends 131b, 141b is supported by a projection 154 of the caliper 150 with the operation thereof being the same as discussed hereinabove with respect to the first embodiment.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A disc brake assembly for a wheel of a vehicle having a non-rotatable part comprising:

a rotatable disc plate secured to said wheel for unitary rotation therewith;

first and second friction pads for frictional engagement with a first and second side of said rotatable disc plate, respectively;

an adapter secured to said non-rotatable part of the vehicle, said adapter including a base portion extending in the radial direction with respect to said disc and being secured to said non-rotatable part of said vehicle by bolts, said adapter further including a first arm portion including a first hole, said adapter further including a second arm portion including a second hole;

caliper means including an opening for allowing said pads to pass therethrough and a fluid actuator disposed therein for moving said first and second friction pads into engagement with said disc plate, said caliper means being movably supported by said adapter and said pads being supported by said caliper means via supporting members extending therebetween, wherein said caliper means includes a cylinder portion, a reaction portion and two connecting portions at the top of said caliper means and connecting said cylinder portion and said reaction portion; wherein one of said connecting portions is provided with a recess opening to the outer circumferential surface of said disc, and wherein a second of said connecting portions is quadrilateral in section and is farther from said non-rotatable part of said vehicle than is said one of said connecting portions;

caliper supporting means secured to said caliper means and slidably supported by said adapter for guiding movement of said caliper means, said caliper supporting means comprising a pair of pins, one of said pins being positioned in, and protected by, said recess of said one of said connecting portions and in said first hole, the second of said pins being positioned radially below said cylinder portion of said caliper means and in said second hole;

said friction pads contacting said adapter at a first end portion thereof and directly contacting said caliper at a second end portion thereof opposite said first end portion, said second end portion comprising said first arm portion, to thereby receive braking torque exerted under a vehicle forward movement condition directly by said adapter and to receive braking torque exerted under a vehicle reverse movement condition by said caliper and said caliper supporting means.

2. A disc brake assembly as set forth in claim 1, further comprising an elastic boot member within which said pin member is disposed.

* * * * *